US011376544B2

(12) United States Patent
Ames

(10) Patent No.: US 11,376,544 B2
(45) Date of Patent: Jul. 5, 2022

(54) CONTAMINANT SCRUBBER OF A HEATING, VENTILATION, AND AIR CONDITIONING (HVAC) SYSTEM

(71) Applicant: Air Distribution Technologies IP, LLC, Milwaukee, WI (US)

(72) Inventor: Alex J. Ames, Farmers Branch, TX (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 470 days.

(21) Appl. No.: 16/228,111

(22) Filed: Dec. 20, 2018

(65) Prior Publication Data

US 2020/0139293 A1 May 7, 2020

Related U.S. Application Data

(60) Provisional application No. 62/757,030, filed on Nov. 7, 2018.

(51) Int. Cl.
*B01D 53/04* (2006.01)
*F24F 13/20* (2006.01)
*F24F 8/10* (2021.01)

(52) U.S. Cl.
CPC ..... *B01D 53/0446* (2013.01); *B01D 53/0415* (2013.01); *F24F 8/10* (2021.01); *F24F 13/20* (2013.01); *B01D 2259/40086* (2013.01); *B01D 2259/4508* (2013.01)

(58) Field of Classification Search
CPC ........ B01D 2257/504; B01D 2257/708; B01D 2258/06; B01D 2259/40086; B01D 2259/4009; B01D 2259/4508; B01D 53/0415; B01D 53/0446; F24F 13/20; F24F 8/10; Y02C 20/40
See application file for complete search history.

(56) References Cited

U.S. PATENT DOCUMENTS

| | | | |
|---|---|---|---|
| 6,726,558 B1 | 4/2004 | Meirav | |
| 6,866,701 B2 | 3/2005 | Meirav | |
| 7,430,835 B1* | 10/2008 | Larson | E06B 7/2305 49/400 |
| 8,157,892 B2 | 4/2012 | Meirav | |
| 8,491,710 B2 | 7/2013 | Meirav | |
| 8,690,999 B2 | 4/2014 | Meirav et al. | |
| 9,316,410 B2 | 4/2016 | Meirav et al. | |
| 9,328,936 B2 | 5/2016 | Meirav et al. | |
| 9,375,672 B2 | 6/2016 | Meirav et al. | |

(Continued)

OTHER PUBLICATIONS

Google search (year: 2021).*

*Primary Examiner* — Robert A Hopkins
(74) *Attorney, Agent, or Firm* — Fletcher Yoder, P.C.

(57) ABSTRACT

A contaminant scrubber of a heating, ventilation, and air conditioning (HVAC) system includes a sorption cavity, a sorption inlet damper configured to receive return air from a conditioned space and into the sorption cavity, and a sorption outlet damper configured to output the return air from the sorption cavity and toward the conditioned space. The contaminant scrubber also includes an outer housing about the sorption cavity, the outer housing having a mount-facing side wall along which the sorption inlet damper and the sorption outlet damper are disposed.

15 Claims, 11 Drawing Sheets

(56) References Cited

U.S. PATENT DOCUMENTS

| | | | |
|---|---|---|---|
| 9,399,187 B2* | 7/2016 | Meirav | F24F 3/0442 |
| 9,533,250 B2 | 1/2017 | Meirav et al. | |
| 9,566,545 B2 | 2/2017 | Meirav et al. | |
| 2004/0112211 A1 | 6/2004 | Meirav | |
| 2008/0022615 A1* | 1/2008 | Fox | F24F 13/32 52/302.1 |
| 2011/0198055 A1 | 8/2011 | Meirav et al. | |
| 2011/0265648 A1 | 11/2011 | Meirav | |
| 2011/0277490 A1 | 11/2011 | Meirav | |
| 2012/0273980 A1 | 11/2012 | Meirav | |
| 2013/0178987 A1 | 7/2013 | Meirav et al. | |
| 2013/0291732 A1 | 11/2013 | Meirav | |
| 2014/0020559 A1 | 1/2014 | Meirav et al. | |
| 2014/0202330 A1 | 7/2014 | Meirav et al. | |
| 2014/0260965 A1* | 9/2014 | Finkam | F24F 11/77 95/12 |
| 2014/0298996 A1 | 10/2014 | Meirav et al. | |
| 2014/0326428 A1 | 11/2014 | Meirav et al. | |
| 2015/0078964 A1 | 3/2015 | Meirav et al. | |
| 2015/0258488 A1 | 9/2015 | Meirav et al. | |
| 2015/0298043 A1 | 10/2015 | Meirav et al. | |
| 2015/0321135 A1 | 11/2015 | Meirav et al. | |
| 2015/0352518 A1 | 12/2015 | Meirav et al. | |
| 2015/0375157 A1 | 12/2015 | Meirav | |
| 2016/0025578 A1 | 1/2016 | Meirav et al. | |
| 2016/0082383 A1 | 3/2016 | Meirav et al. | |
| 2016/0187012 A1 | 6/2016 | Meirav et al. | |
| 2016/0228809 A1 | 8/2016 | Meirav et al. | |
| 2016/0228811 A1 | 8/2016 | Meirav et al. | |
| 2016/0282001 A1 | 9/2016 | Meirav et al. | |
| 2016/0288043 A1 | 10/2016 | Meirav et al. | |
| 2016/0303503 A1 | 10/2016 | Meirav et al. | |
| 2016/0327293 A1* | 11/2016 | Grabowski | F24F 11/30 |
| 2016/0363333 A1 | 12/2016 | Meirav et al. | |
| 2017/0056812 A1 | 3/2017 | Meirav et al. | |
| 2017/0136399 A1 | 5/2017 | Meirav et al. | |
| 2018/0147526 A1* | 5/2018 | Meirav | F24F 11/30 |

* cited by examiner

CONTAMINANT SCRUBBER OF A HEATING, VENTILATION, AND AIR CONDITIONING (HVAC) SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are generally configured to provide temperature controlled air to an internal space. To do so, the HVAC system may combine a portion of outdoor air with a portion of indoor air, or "return air," where "return air" refers to a portion of air that is returned to the HVAC system from the internal space. The return air may include an undesirable amount of carbon dioxide and other contaminants, such as formaldehyde and volatile organic compounds, compared to the outdoor air, but may be less expensive to cool or heat than the outdoor air. Thus, use of the indoor air may improve cooling and heating efficiency, and the outdoor air may be used primarily for ventilation purposes.

To reduce an amount of outdoor air required for ventilation purposes, HVAC systems may include a contaminant scrubber that receives the return air, removes at least some of the carbon dioxide and other contaminants from the return air, and outputs the cleaner return air for use by an air handling unit. The air handling unit may receive the portion of outdoor air, may receive the portion of return air cleaned and output by the contaminant scrubber, may combine the portions together as a supply air, and may output the supply air for use by components of the HVAC downstream of the air handling unit.

HVAC system components, and contaminant scrubbers in particular, may be regulated in various jurisdictions to require certain components and/or functionality. The regulations may vary between jurisdictions, and traditional contaminant scrubbers may fail to meet certain of these regulations in certain of these jurisdictions. Further, traditional contaminant scrubbers may be capable of removing only a small amount of carbon dioxide. Further still, traditional contaminant scrubbers may be designed for indoor storage and use, and may be functionally and/or legally unsuitable or undesirable for outdoor installation and use. Accordingly, improved HVAC contaminant scrubbers are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a contaminant scrubber of a heating, ventilation, and air conditioning (HVAC) system includes a sorption cavity, a sorption inlet damper configured to receive return air from a conditioned space and into the sorption cavity, and a sorption outlet damper configured to output the return air from the sorption cavity and toward the conditioned space. The contaminant scrubber also includes an outer housing about the sorption cavity, the outer housing having a mount-facing side wall along which the sorption inlet damper and the sorption outlet damper are disposed.

A second embodiment of the present disclosure relates to a contaminant scrubber of a heating, ventilation, and air conditioning (HVAC) system. The contaminant scrubber includes a mount-facing side wall configured to be mounted along a wall of a building, a sorption inlet damper disposed along and through the mount-facing side wall and configured to receive return air from a conditioned space, and a sorption outlet damper disposed along and through the mount-facing side wall and configured to output the return air toward the conditioned space. The contaminant scrubber also includes a sorption cavity in fluid communication with the sorption inlet damper and the sorption outlet damper.

A third embodiment of the present disclosure relates to an outdoor contaminant scrubber of a heating, ventilation, and/or air conditioning system. The outdoor contaminant scrubber includes a sorption inlet damper configured to receive return air from a conditioned space, and a sorption outlet damper configured to output the return air toward the conditioned space. The outdoor contaminant scrubber also includes a purge/regeneration inlet damper configured to receive outdoor air from an outdoor environment in which the outdoor contaminant scrubber is disposed. The outdoor contaminant scrubber also includes a purge/regeneration outlet damper configured to output the outdoor air to the outdoor environment. The sorption inlet damper, the sorption outlet damper, the purge/regeneration inlet damper, or the purge/regeneration outlet damper comprises a rectangular flow path perimeter and a low leak economizer blade. Further, the outdoor contaminant scrubber includes a sorption cavity in fluid communication with the sorption inlet damper, the sorption outlet damper, the purge/regeneration inlet damper, and the purge/regeneration outlet damper.

DETAILED DESCRIPTION

Figure 1:
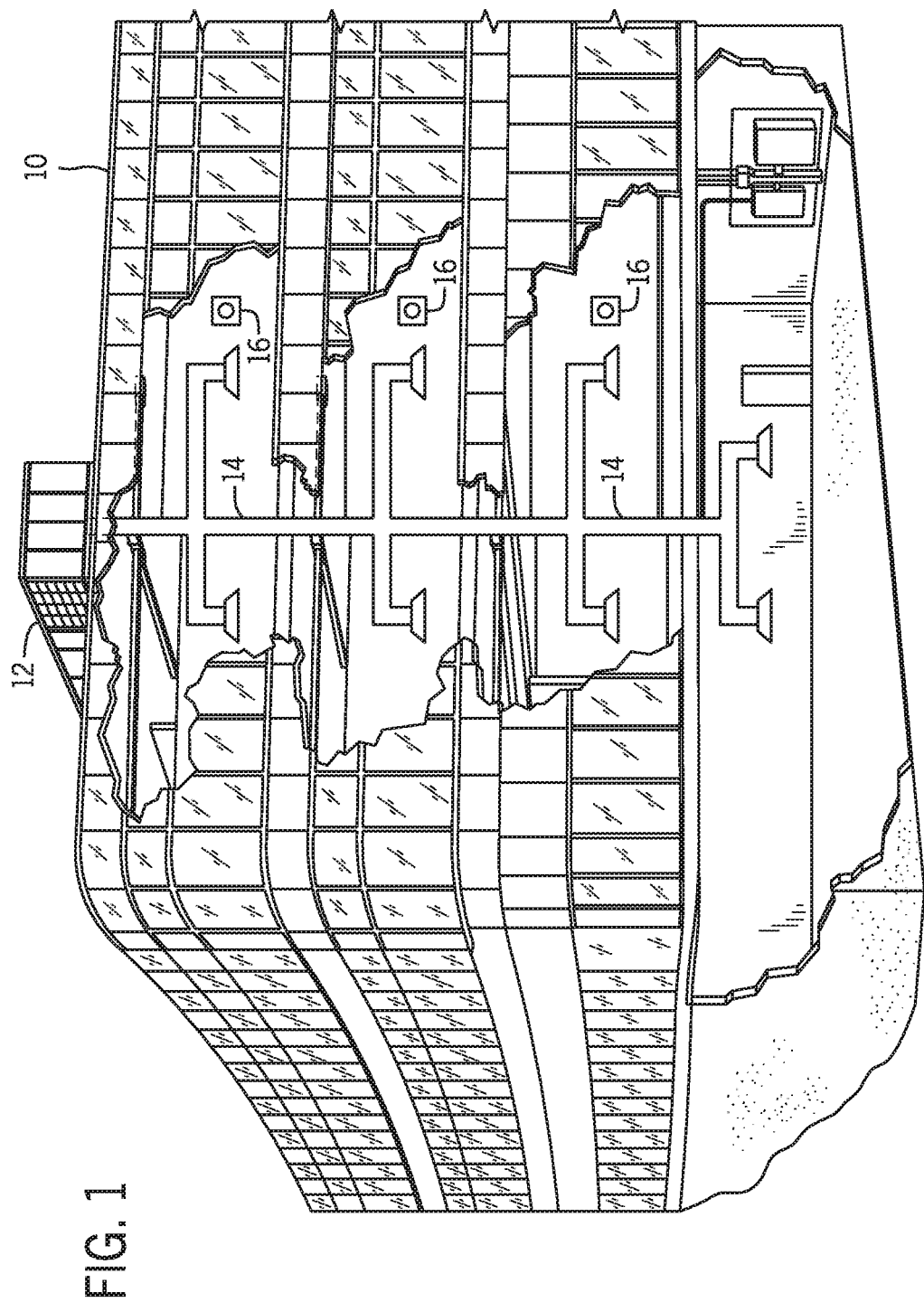
FIG. 1 is a perspective view a heating, ventilation, and air conditioning (HVAC) system for building environmental management, in accordance with embodiments described herein.

The present disclosure is directed toward outdoor contaminant scrubbers of a commercial, industrial, or residential heating, ventilation, and air conditioning ("HVAC") system. For example, HVAC systems are generally configured to provide temperature controlled air to an internal space. To do so, the HVAC system may combine a portion of outdoor air with a portion of indoor air, or "return air," where "return air" refers to a portion of air that is returned to the HVAC system from the internal space. The return air may include an undesirable amount of carbon dioxide and other contaminants, such as formaldehyde and volatile organic compounds, compared to the outdoor air, but may be less expensive to cool or heat than the outdoor air. Thus, use of the indoor air may improve cooling and heating efficiency, and the outdoor air may be used primarily for ventilation purposes.

To reduce an amount of outdoor air required for ventilation purposes, HVAC systems may include a contaminant scrubber that receives the return air, removes at least some of the carbon dioxide and other contaminants from the return air, and outputs the cleaner return air for use by an air handling unit. The air handling unit may receive the portion of outdoor air, may receive the portion of return air cleaned and output by the contaminant scrubber, may combine the portions together as a supply air, and may output the supply air for use by components of the HVAC downstream of the air handling unit.

Outdoor contaminant scrubbers in accordance with the present disclosure may include several operating modes. For example, an embodiment of an outdoor contaminant scrubber may include a sorption mode, a regeneration mode, and a purge mode. In some embodiments, the regeneration mode and the purge mode of the outdoor contaminant scrubber may overlap. In other words, in some embodiments, at least portions of the regeneration and purge modes may occur simultaneously.

During the sorption mode, return air flows into the outdoor contaminant scrubber, then flows through a cartridge set of the outdoor contaminant scrubber, which removes certain contaminants from the return air. That is, the cartridge set may include sorbent cartridges. The contaminant scrubber may then route the decontaminated return air back toward the conditioned space, and in some embodiments the cleaned return air may be combined with fresh outdoor air. The decontaminated return air and/or the portion of fresh outdoor air combined therewith may be referred to as "supply air," as it is supplied to the space being conditioned by the HVAC system. In general, use of the decontaminated return air reduces an amount of fresh outside air (and corresponding heating/cooling) required to heat/cool the building, which reduces an HVAC system load.

During the regeneration mode, a heating element may be activated to heat an internal space of the outdoor contaminant scrubber. Further, dampers of the outdoor contaminant scrubber may be controlled to enable various air inputs and outputs associated with the regeneration mode. That is, the dampers may be controlled to facilitate movement between the various operating modes. During the regeneration mode, the heat from the heating element may cause the contaminants absorbed by the cartridges of the cartridge set to be released therefrom. The dampers of the outdoor contaminant scrubber may be controlled to block air input and outputs during at least portions of the regeneration mode. Thus, the contaminants may be released via the above-described heating of the cartridge set, and the contaminants may be contained within an internal space of the outdoor contaminant scrubber for a period of time.

During the purge mode, the dampers may be controlled to enable purging of the contaminants from the internal space of the outdoor contaminant scrubber to an environment, for safe removal of the contaminants. For example, during the purge mode, environmental air may be drawn into the outdoor contaminant scrubber to mingle with and displace the contaminants. This mixture may be output to the environment, such that the environmental air removes the contaminants from the internal space of the outdoor contaminant scrubber.

After the cartridge set is regenerated and the contaminants are purged from the outdoor contaminant scrubber, the dampers of the outdoor contaminant scrubber may be controlled to enable in-flow of return air to operate the outdoor contaminant scrubber in the sorption mode, as previously described. Structural components of the outdoor contaminant scrubber, in accordance with the present disclosure, are generally designed to facilitate and/or improve outdoor installation, efficiency, and use of the outdoor contaminant scrubber.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
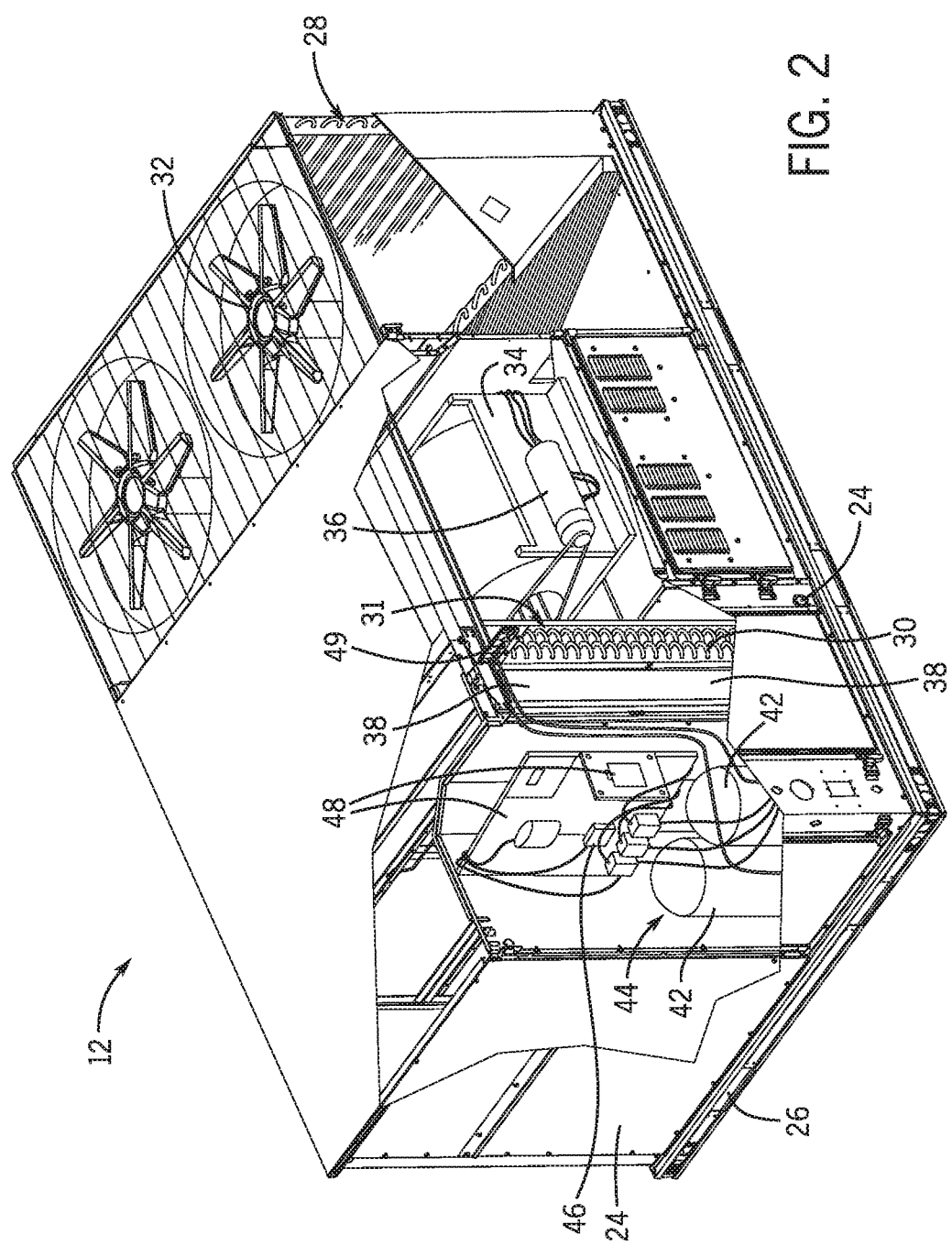
FIG. 2 is a perspective view of an HVAC unit, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
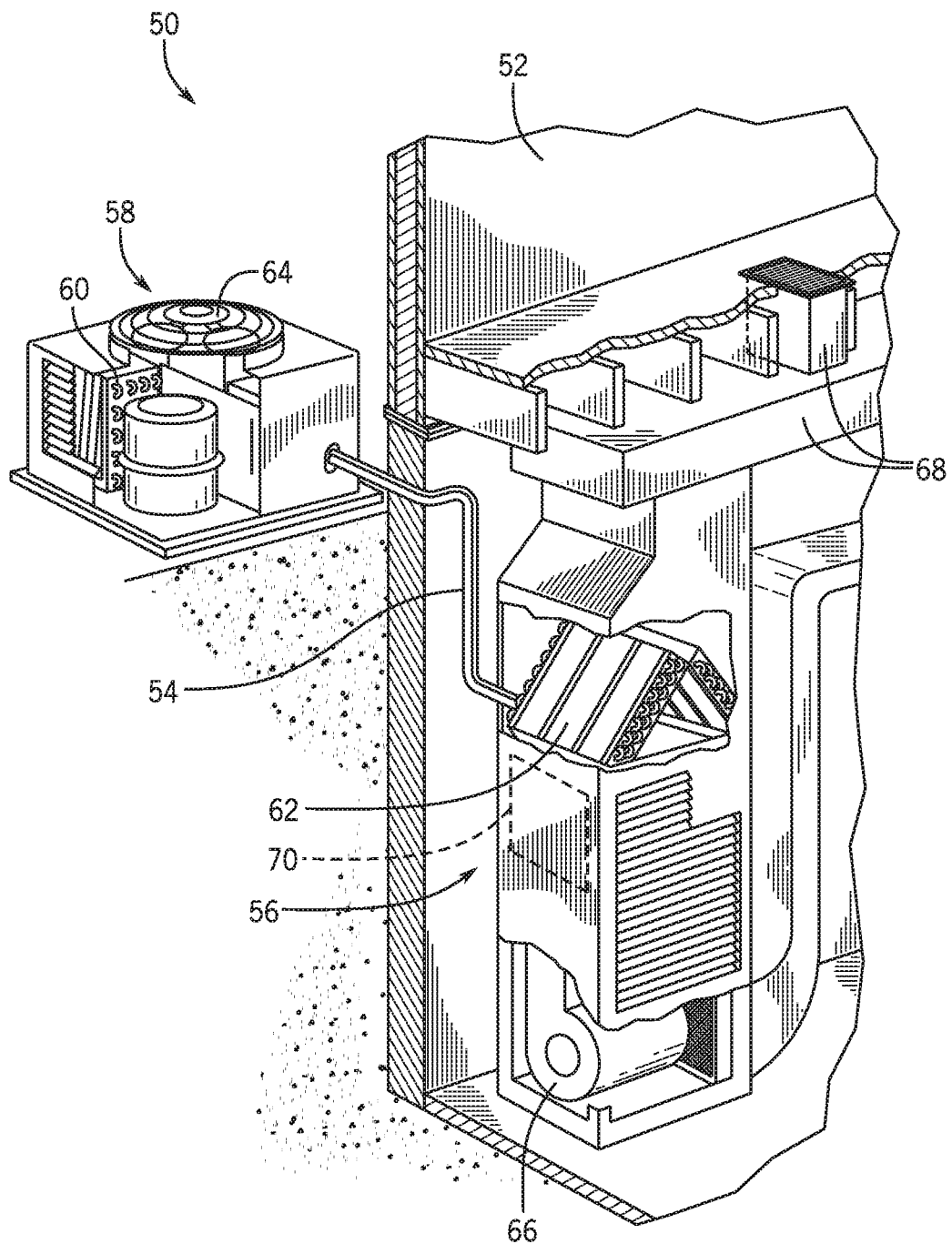
FIG. 3 is a perspective view of a residential split heating and cooling system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
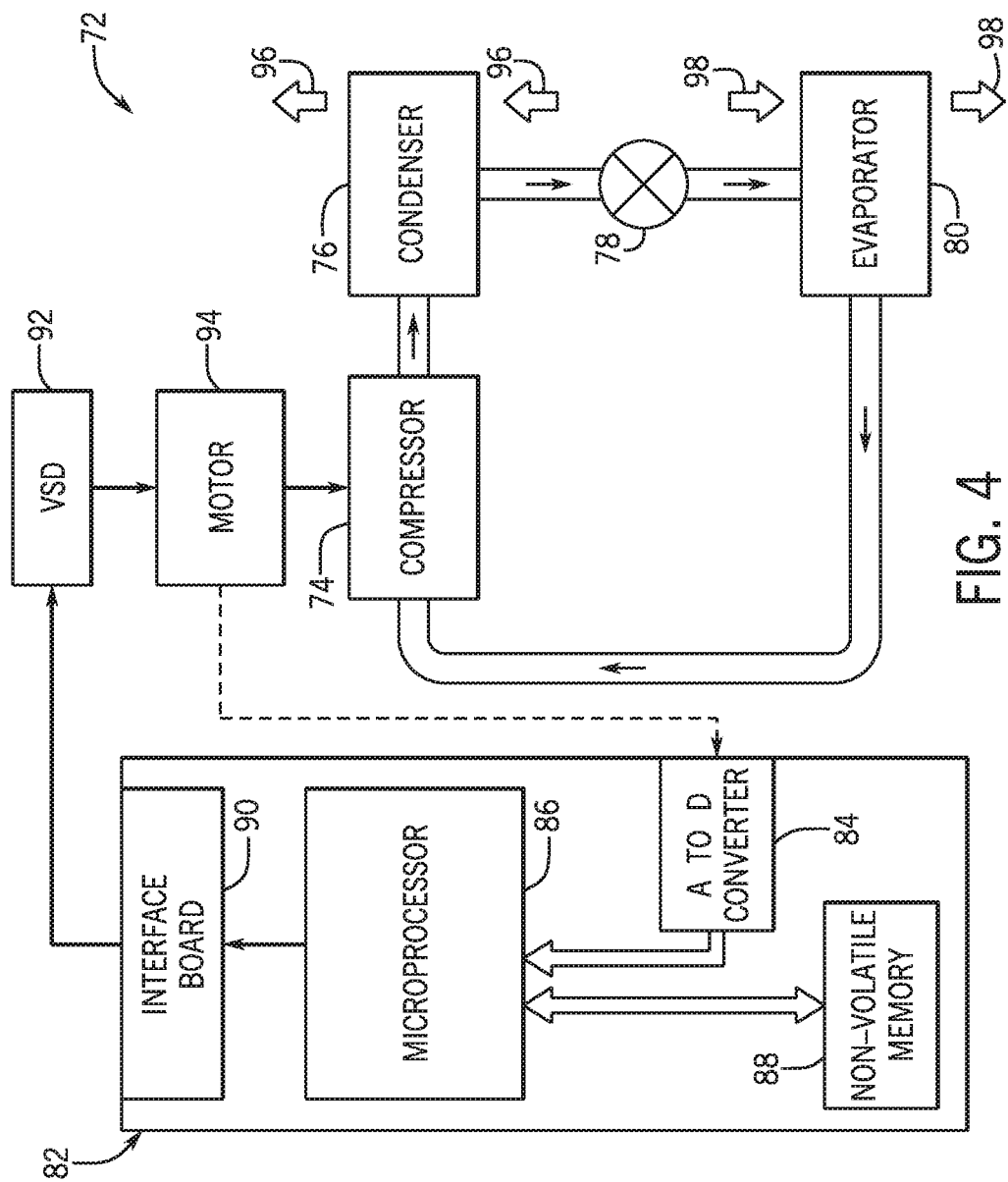
FIG. 4 is a schematic diagram of a vapor compression system that may be used in an HVAC system, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications. Any of FIGS. 1-4 may include an outdoor contaminant scrubber in accordance with the following description.

Figure 5:
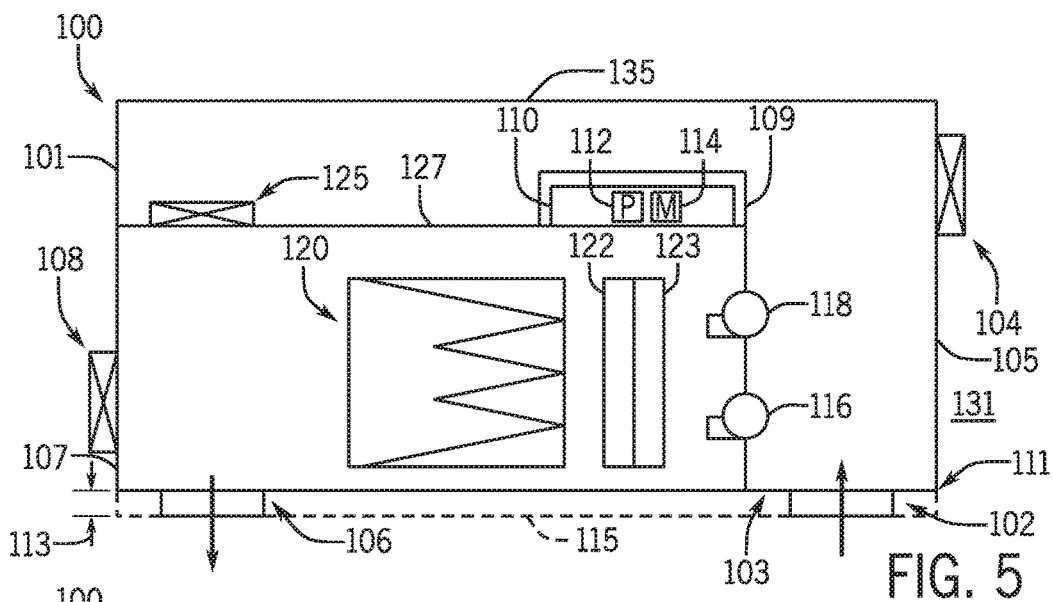
FIG. 5 is a schematic illustration of an outdoor contaminant scrubber operating in a sorption mode, in accordance with embodiments described herein.
Figure 6:
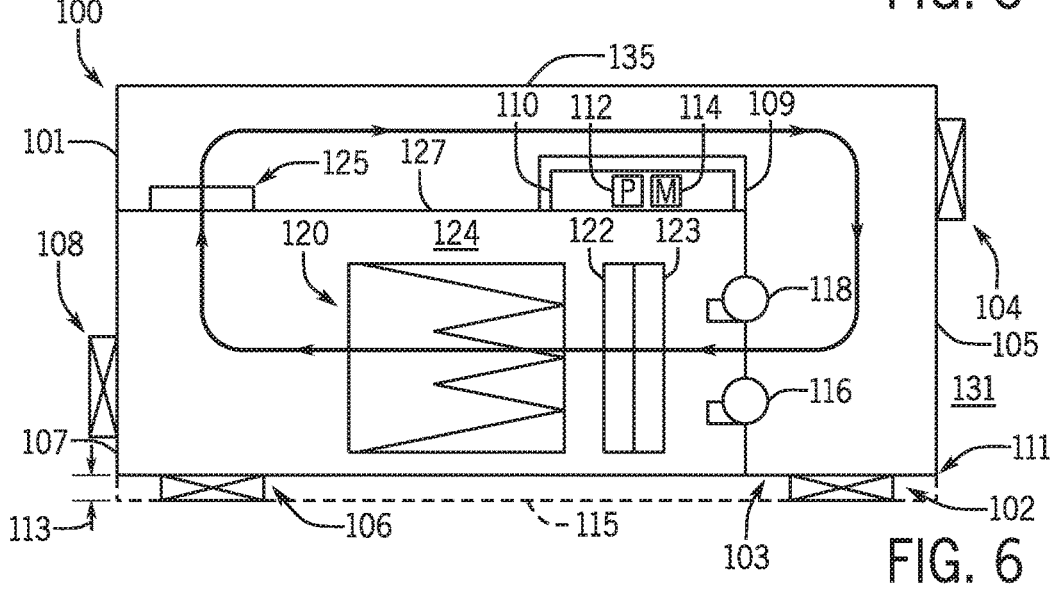
FIG. 6 is a schematic illustration of the outdoor contaminant scrubber of FIG. 5 operating in a regenerative heating mode, in accordance with embodiments described herein.
Figure 7:
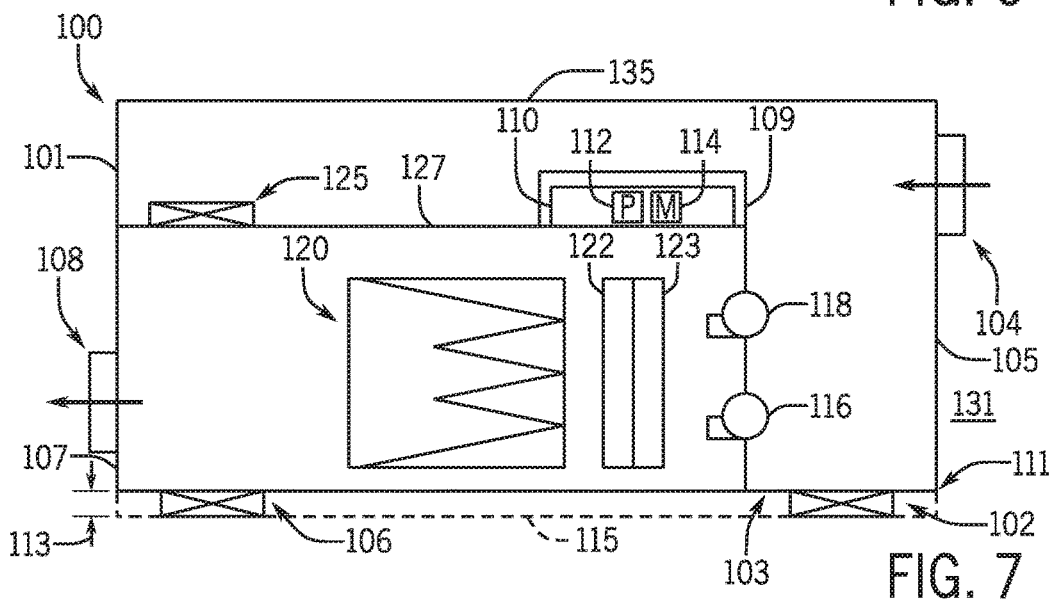
FIG. 7 is a schematic illustration of the outdoor contaminant scrubber of FIG. 5 operating in a purge mode, in accordance with embodiments described herein.

FIGS. 5-7 are schematic illustrations of an embodiment of the outdoor contaminant scrubber 100 of the HVAC system of FIGS. 1-4. FIG. 5 illustrates the outdoor contaminant scrubber 100 operating in a sorption mode, FIG. 6 illustrates the outdoor contaminant scrubber 100 operating in a regeneration mode, and FIG. 7 illustrates the outdoor contaminant scrubber 100 operating in a purge mode. In some embodiments, the regeneration mode and the purge mode of the outdoor contaminant scrubber 100 may overlap. In other words, in some embodiments, at least portions of the regeneration and purge modes may occur simultaneously.

The illustrated outdoor contaminant scrubber 100 includes two inlet dampers, namely, a sorption inlet damper 102 and a regeneration inlet damper 104. As shown, the sorption inlet damper 102 may be disposed along or through a side wall 103 of the outdoor contaminant scrubber 100, and the regeneration inlet damper 104 may be disposed on a different side wall 105 of the outdoor contaminant scrubber, where the side wall 103 having the sorption inlet damper 102 is adjacent and coupled to the different side wall 105 having the regeneration inlet damper 104.

The side wall 103 having the sorption inlet damper 102 may be configured to abut a roof of a building conditioned by the HVAC system having the outdoor contaminant scrubber 100. For example, the side wall 103 may also include a sorption outlet 106 disposed therethrough, where both the sorption inlet 102 and the sorption outlet 106 couple to duct connections from the building. By disposing the sorption inlet 102 and the sorption outlet 106 on the same side wall 103, coupling to the duct connections of the building is improved. The common side wall 103 may include, for example, a frame member 111 and/or a mounting box 115, and may be configured to abut the surface of the roof on which the outdoor contaminant scrubber 100 is installed. The frame member 111 and/or the mounting box 115 may, for example, support a weight of the outdoor contaminant scrubber 100, and may facilitate a clearance 113 suitable for coupling duct connections of the building with the illustrated sorption inlet 102 and sorption outlet 106. The common side wall 103, which may include the frame member 111 and the mounting box 115 below the frame member 111, as noted above, may be referred to as a "mount-facing" wall because it may face, upon installation, a wall of a building on which the contaminant scrubber 100 may be mounted.

As noted above, the illustrated outdoor contaminant scrubber 100 also includes outlet dampers, namely, the above-described sorption outlet damper 106 and a regeneration outlet damper 108. The sorption outlet damper 106 may be disposed on the same side wall 103 as the sorption inlet damper 102, for at least the reasons described above, and the regeneration outlet damper 108 may be disposed on a side wall 107 of the outdoor contaminant scrubber 100 which is adjacent to the side wall 103 having the sorption outlet 106. An internal closed loop damper 125 is also employed to facilitate various operating modes described below.

A control box 110 of the outdoor contaminant scrubber 100 maybe disposed within an enclosure 109 inside the outer housing 101 of the contaminant scrubber 100, and may operate to, among other things, control opening and closing of the inlet dampers 102, 104, the outlet dampers 106, 108, and the closed loop damper 125, based on the desired operating mode of the outdoor contaminant scrubber 100. For example, the control box 110 may include a controller, such as a PLC, having a processor 112 and a memory 114. The memory 114 may include instructions stored thereon that, when executed by the processor 112, cause the control box 110 to instruct opening and/or closing various ones of the dampers 102, 104, 106, 108, 125. The outdoor contaminant scrubber 100 also includes two fans 116, 118 configured to cause air flow through and to the inlet, outlet, and internal dampers 102, 104, 106, 108, 125. In other embodiments, the outdoor contaminant scrubber 100 may include a different number of fans 116, 118. The control box 110 may also operate to control heating elements 123 of the outdoor contaminant scrubber 100. As will be described in detail below, the operating mode instructed by the control box 110 may determine operation of the fans 116, 118, opening/closing of the dampers 102, 104, 106, 108, 125 is closed, and activation of the heating elements 123.

Focusing on FIG. 5, the outdoor contaminant scrubber 100 includes a cartridge set 120 that, when the outdoor contaminant scrubber 100 operates in the sorption mode, sorbs (i.e., absorbs, adsorbs, or some combination thereof) contaminants passing therethrough. For example, in the sorption mode illustrated in FIG. 5, the control box 110 instructs the sorption inlet damper 102 and the sorption outlet damper 106, disposed on a common side wall 103 of the outdoor contaminant scrubber 100, to open, and the control box 110 instructs the regeneration inlet damper 104, the regeneration outlet damper 108, and the closed loop damper 125 to close. Thus, return air flows into the outdoor contaminant scrubber 100 through the sorption inlet damper 102, flows through the cartridge set 120 which removes contaminants from the return air, and flows out of the outdoor contaminant scrubber 100 through the sorption outlet damper 106. It should be noted that, in some embodiments, the sorption inlet damper 102 may include various partially opened configurations, as instructed by the control box 110, to determine an amount of return air received by the outdoor contaminant scrubber 100. This determination may be made by the control box 110 based on data feedback, for example relating to air flow characteristics, temperature, contaminant content and composition, moisture content, or other parameters. Further, it should be noted that the outdoor contaminant scrubber 100 in the illustrated embodiment includes a flame stop baffle 122 disposed above heating element 123, but that the heating element 123 may not be activated during the sorption mode illustrated in FIG. 5. In some embodiments of the outdoor contaminant scrubber 100, the flame stop baffle 122 is not included due to reduced effects and/or necessity in an outdoor context.

FIG. 6 illustrates the outdoor contaminant scrubber 100 operating in the regeneration mode. In the illustrated embodiment, all four dampers 102, 104, 106, 108 of the outdoor contaminant scrubber 100 may be closed, and closed loop damper 125 may be open, for example as instructed by the control box 110. In the regeneration mode, the heating element 123 may be activated to heat an internal space 124, referred to as a "sorption cavity" of the outdoor contaminant scrubber 100. The heat may cause the contaminants sorbed by the cartridges of the cartridge set 120 to be released therefrom. The circular arrows illustrated in FIG. 6 represent the closed-loop heating by the heating element 123. In some embodiments, the heating element 123 may be activated to heat the sorption cavity 124 while the fans 116, 118 are active and the closed loop damper 125 stays open, to facilitate air flow through the sorption cavity 124.

FIG. 7 illustrates the outdoor contaminant scrubber 100 operating in the purge mode, which may be utilized to remove contaminants resident in the sorption cavity 124, for example following the regeneration mode described above. As previously described, at least portions of the regeneration mode and the purge mode may overlap. Further, both the regeneration mode and the purge mode correspond to scrubber modes which are utilized to restore a condition of the outdoor contaminant scrubber 100 for the sorption mode, where there regeneration mode restores the condition of the cartridges 120 and the purge mode restores the condition of the sorption cavity 124. Thus, certain aspects of the regeneration mode and the purge mode, and corresponding scrubber components, may be referred to interchangeably, such as the regeneration inlet and regeneration outlet dampers 104, 108, which could also be referred to as purge inlet and purge outlet dampers. In general, the dampers 104, 108 are closed during the regeneration mode to facilitate regeneration of the cartridge set, and opened during the purge mode to facilitate purging of the contaminants from the sorption cavity 124 via an air flow through the purge/regeneration inlet damper 104 and out of the purge/regeneration outlet damper 108.

Further, the sorption inlet damper 102 and the sorption outlet damper 106 are closed, as shown, during both the regeneration mode (FIG. 6) and the purge mode (FIG. 7). The closed loop damper 125 may modulate to open during the regeneration mode, which facilitates the closed-loop heating and/or air flow as previously described, and may modulate to closed during the purge mode, which facilitates an air flow from the purge/regeneration inlet damper 104 to the purge/regeneration outlet damper 108. That is, the fans 116, 118 may draw a purge gas, such as environmental air from environment 131, into the sorption cavity 124 during the purge mode, where the purge gas urges the contaminants in the sorption cavity 124 toward and through the purge/regeneration outlet damper 108. By disposing the purge/regeneration inlet damper 104 on or along the wall 105 of the outdoor contaminant scrubber 100 and the purge/regeneration outlet damper 108 on or along an opposing wall 107 of the outdoor contaminant scrubber 100, the above-described air flow during the purge mode may be improved because the purge air must traverse a length of the outdoor contaminant scrubber 100. For a similar reason, a vertical or horizontal offset between the purge/regeneration inlet damper 104 and the purge/regeneration outlet damper 108 may also improve regeneration and purging. That is, by disposing the purge/regeneration inlet damper 104 proximate to a corner between side wall 105 and side wall 135 (e.g., upper side wall), and by disposing the purge/regeneration outlet damper 108 proximate to a corner between the side walls 103 and 135, a purge air flow travels catty-corner through the contaminant scrubber 100, removing contaminants from the sorption cavity 124.

The side wall 135 of the outdoor contaminant scrubber 100, which may be an upper side wall, may be flat and may not include dampers disposed thereon. That is, dampers may be disposed along three walls 103, 105, 107 of the outdoor contaminant scrubber 100, but the illustrated remaining wall 135 may not include any dampers. It should be noted that the side walls 103, 105, 107, 135 may partially form an outer housing 101 of the contaminant scrubber 100, and may include features like access door panels, outer frame members, and the like described in detail below. That is, the side walls 103, 105, 107, 135 may not each include a single panel or panel assembly, but may instead be formed by a series of outwardly facing components defining at least a portion of an outer perimeter of the outdoor contaminant scrubber 100. However, the disclosed side walls 103 (which may include the frame member 111 and/or "mounting box"), 105, 107, 135 generally form the outermost portions of the contaminant scrubber 100, with the side wall 103 (which may include the frame member 111 and/or mounting box 115) facing a building on which the scrubber 100 is mounted and serviced. Further, it should be noted that the dampers 102, 104, 106, 108 in the embodiments illustrated in FIGS. 5-7 are shown along the outer housing 101 outdoor contaminant scrubber 100, but that the dampers 102, 104, 106, 108 may be disposed inside the outdoor contaminant scrubber 100 and/or may traverse the outer walls of the outdoor contaminant scrubber 100.

Figure 8:
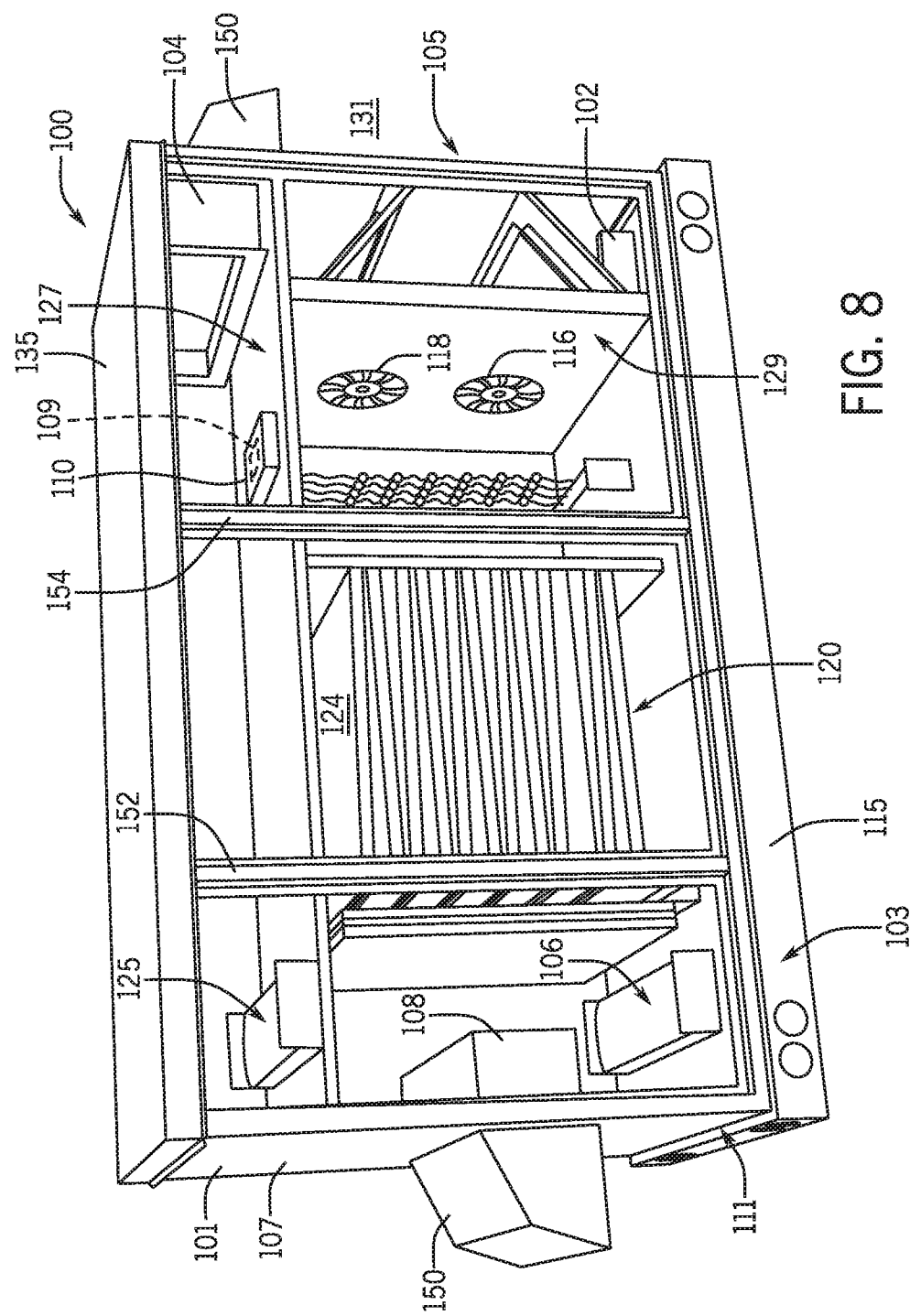
FIG. 8 is a perspective view of a portion of the outdoor contaminant scrubber of FIG. 5, in accordance with embodiments described herein.

An overhead perspective view of an embodiment of a portion of the outdoor contaminant scrubber 100 of FIGS. 5-7 is illustrated in FIG. 8. While at least portions of the side walls 103, 105, 107, 135 of the outer housing 101 are shown, it should be noted that a door panel forming a portion of the side wall 105 is removed in FIG. 8, but is shown in FIGS. 10-14.

As shown in FIG. 8, the outdoor contaminant scrubber 100 includes the regeneration inlet damper 104 disposed adjacent to or through the side wall 105 of the outdoor contaminant scrubber 100, the sorption inlet damper 102 and the sorption outlet damper 106 disposed adjacent to or through the side wall 103 of the outdoor contaminant scrubber 100 adjacent to the side wall 105, and the regeneration outlet damper 108 disposed adjacent to or through the side wall 107 of the outdoor contaminant scrubber 100 adjacent to the side wall 103 and opposing the side wall 105. It should be noted that reference to various dampers being "adjacent" to a particular wall of the contaminant scrubber 100, as used in accordance with the present disclosure, means that the damper interfaces with the wall, for example via an opening in the wall fluidly coupled with the damper. The opening in the wall may be considered a part of the damper, for example a part of an inlet or outlet of the inlet damper or the outlet damper, respectively. It should be understood, however, that illustration of the dampers on an external surface of the contaminant scrubber 100 may be schematic, and that the dampers may instead be positioned along an inner surface of the corresponding wall, and/or traversing the wall such that the damper extends to either side of the wall. As shown, the mounting box 115 and/or the frame member 111 may form the side wall 103 having the sorption inlet and outlet dampers 102, 106. The side wall 103 may be referred to as a "mount-facing wall."

As shown, the regeneration inlet and outlet dampers 104, 108 may handle environmental air. That is, during the purge mode, the regeneration inlet and outlet dampers 104, 108 may be opened to enable air flow of environmental air from the environment 131 through the outdoor contaminant scrubber 100. Thus, rain hoods 150 may be disposed over the openings of the dampers 104, 108, and may block ingress of moisture into the outdoor contaminant scrubber 100. That is, the rain hoods 150 may be mounted to outer surfaces of the walls 105, 107. Because the outdoor contaminant scrubber 100 is positioned on an outside of a wall or roof of a building and directly receives environmental air through the inlet damper 104 and ejects the environmental air to the environment 131 through the outlet damper 108, the dampers 104, 108 do not connect to ductwork. The dampers 104, 108 may each include a rectangular flow path perimeter, in part because they are not coupled to flex (or any other) ducting, and in part because they may include an Air Movement and Control Association (AMCA) 511 certified low leak economizer blade compatible with the rectangular shape, which may facilitate improved water resistance of the outdoor contaminant scrubber 100 compared to embodiments having circular dampers and corresponding circular blades. The "rectangular flow path perimeter" refers to an inner surface defining the flow path of the damper 104 or 108. As previously described, the purge/regeneration dampers 104, 108 and the sorption dampers 102, 106 may be controlled by a controller of a control box 110, where the control box 110 may be disposed in the illustrated enclosure 109. That is, the control hardware may be disposed in the enclosure 109, which may protect the control hardware from, for example, air flow impact. It should be noted that the internal closed loop damper 125 and the enclosure 109 and corresponding control box 110 may be disposed along an inner wall 127 which, together with an additional inner wall 129, forms "inner cabinetry" that separates the inner space 124, or "sorption cavity," of the contaminant scrubber 100 into a first space (e.g., the space having the illustrated cartridges 120) and a second space (e.g., the space having the enclosure 109 and corresponding control box 110).

Further, as will be described in detail with reference to later figures, the outdoor contaminant scrubber 100 may include several door assemblies, which are not shown in the embodiment illustrated in FIG. 8. The door assemblies may at least partially define the outer housing 101 of the outdoor contaminant scrubber 100, for example one or more of the side walls 103, 105, 107, 135 and/or additional side walls of the outer housing 101. A frame of the outdoor contaminant scrubber 100 may also define portions of the side walls 103, 105, 107, 135 and/or additional side walls of the outdoor contaminant scrubber 100. The frame may include, for example, frame members 152, 154 illustrated in FIG. 8. The frame members 152, 154 illustrated in FIG. 8, and the door assemblies not illustrated in FIG. 8, will be described in detail below with reference to FIGS. 9-14, followed by a description, with respect to FIG. 15, of a rectangular damper for use in the contaminant scrubber 100.

Figure 9:
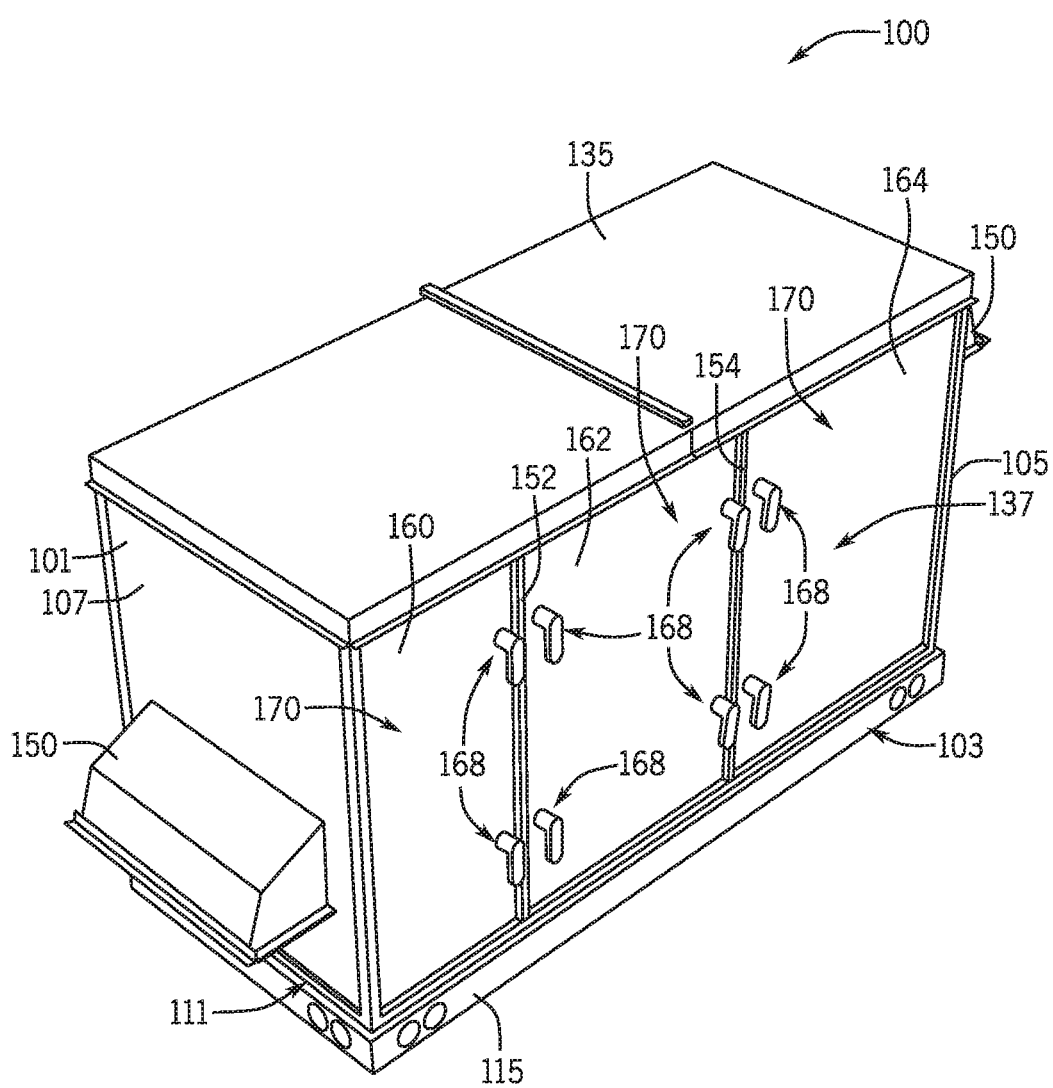
FIG. 9 is a perspective view of the outdoor contaminant scrubber of FIG. 5, in accordance with embodiments described herein.

FIG. 9 is a perspective view of an embodiment of the outdoor contaminant scrubber 100 of FIG. 5. In the illustrated embodiment, the contaminant scrubber 100 includes door assemblies 170 disposed along a side wall 137 of the contaminant scrubber 100. The side wall 137 may not include dampers extending therethrough, but may be reserved for the illustrated door assemblies 170 in order to provide a single side from which most or all of the outdoor contaminant scrubber 100 can be serviced.

In the illustrated embodiment, the side wall 137 includes three door panels 160, 162, 164, which are segmented by the frame members 152, 154 of the outdoor contaminant scrubber 100. Each of the door panels 160, 162, 164 may include one or more handles 168 that, when turned, facilitate opening of the corresponding panel 160, 162, 164. As shown, multiple handles 168 may be employed on a single panel 160. The door panels 160, 162, 164 may be coupled to the frame of the outdoor contaminant scrubber 100 via hinges, and/or the door panels 160, 162, 164 may be removable from the contaminant scrubber 100, after turning the handles 168, to facilitate servicing of the contaminant scrubber 100. While two handles 168 are illustrated for each door panel 160, 162, 164, one handle 168 may be used or more than two handles 168 may be used. Each set of door components may be referred to as a door assembly 170.

Figure 10:
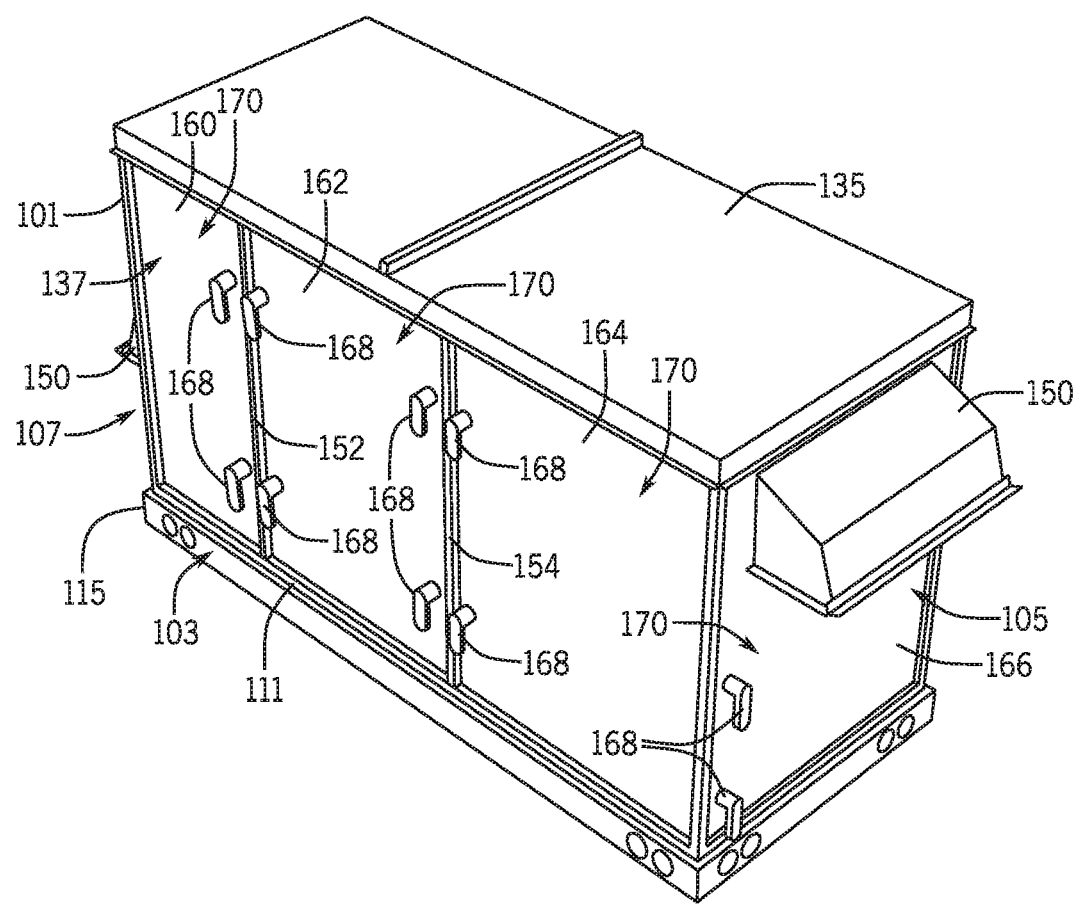
FIG. 10 is a perspective view of the outdoor contaminant scrubber of FIG. 5, in accordance with embodiments described herein.

FIG. 10 is another perspective view of an embodiment of the outdoor contaminant scrubber 100, illustrating the door assemblies 170 employed to facilitate servicing of the outdoor contaminant scrubber 100. Each illustrated door assembly 170 includes two handles 168, as previously described. The door assembly 170 illustrated on the side wall 105 may be disposed adjacent to the fans 116, 118 and the sorption inlet damper 102 of the contaminant scrubber 100 illustrated in FIG. 8, and may facilitate maintenance of particular aspects of the fans 116, 118 and/or sorption inlet damper 102. Aspects of the door assembly 170 are described below with respect to FIGS. 11-14.

Figure 11:
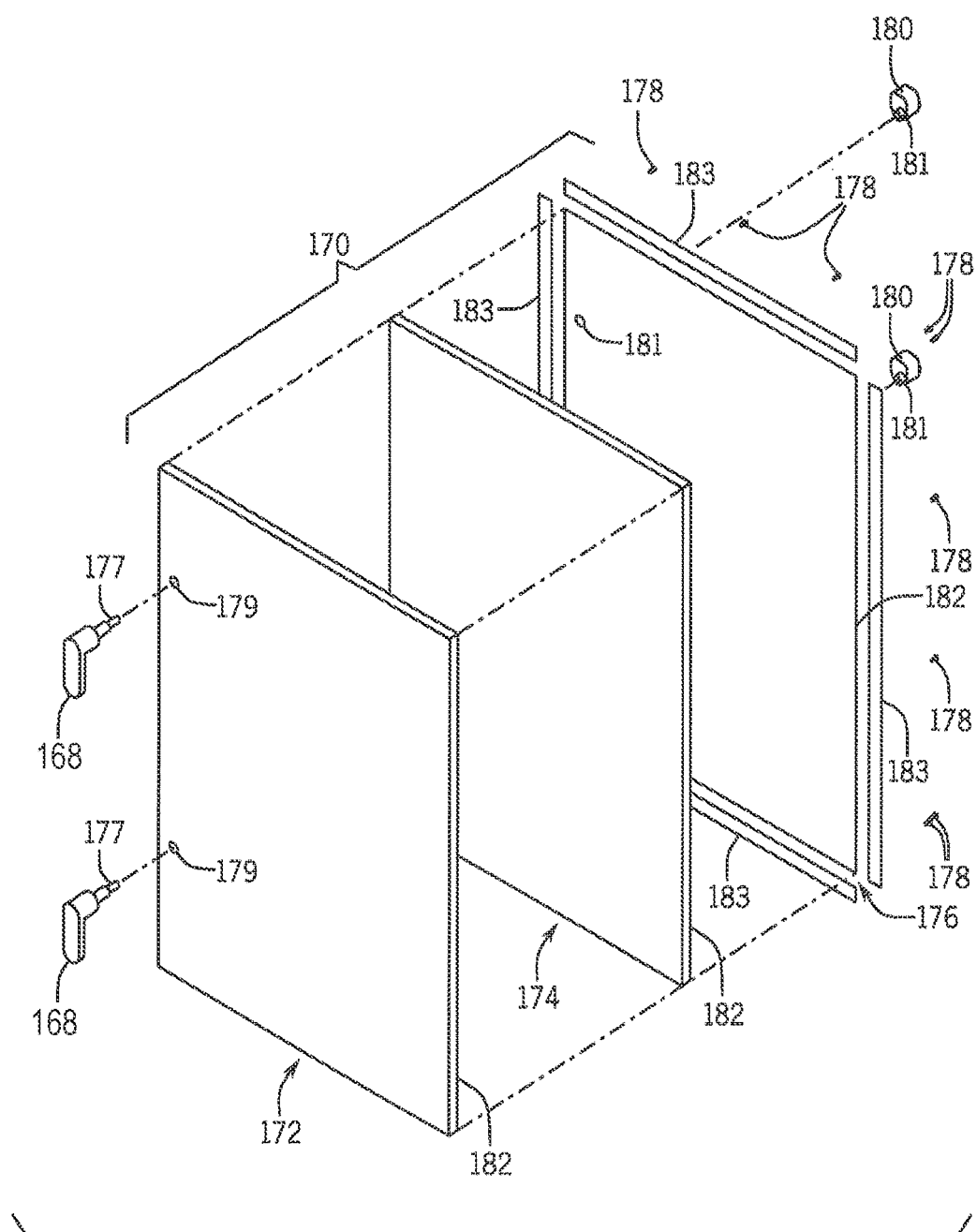
FIG. 11 is an exploded perspective view of a door assembly for use in the contaminant scrubber of FIG. 5, in accordance with embodiments described herein.
Figure 13:
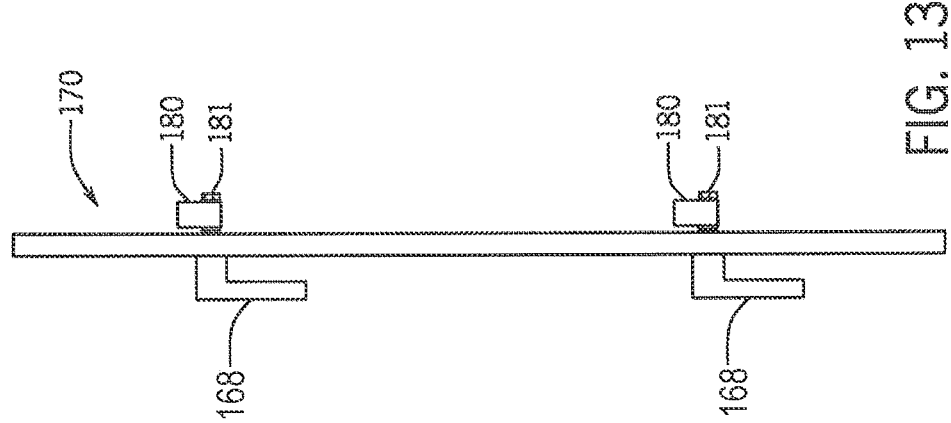
FIG. 13 is a side view of the door assembly of FIG. 11, in accordance with embodiments described herein.

FIG. 11 is an exploded perspective view of an embodiment of the door assembly 170 described above with respect to FIGS. 9 and 10. It should be noted that aspects of the door assembly 170 described below may be applicable to any of the door assemblies 170 illustrated in FIGS. 9 and 10. The door assembly 170 may include, for example, a layered structure having an outer panel 172, a middle layer 174, and an inner panel 176. The middle layer 174 may be sandwiched between the outer panel 172 and the inner panel 176, the outer panel 172 may face outwardly from the contaminant scrubber, and the inner panel 176 may face toward an inside of the contaminant scrubber 100. That is, the outer panel 172 in FIG. 11 may correspond to any one of the panels 160, 162, 164, 166 illustrated in FIG. 10.

Rivets 178 or other fasteners may be utilized to hold the layers 172, 174, 176 together. In general, the layers 172, 174, 176 may be included to shield the contaminant scrubber 100 from the effects of sunlight exposure, and/or to insulate the contaminant scrubber 100. That is, the middle layer 174 may be an insulator, for example having a fiberglass or rubberized foam insulating material, which improves a temperature consistency within the housing 101 (e.g., the sorption cavity 124). Thus, the assembly of the layers 172, 174, 176 may facilitate use of the outdoor contaminant scrubber 100 in an outdoor setting, such as on a roof of a building, which is not isolated from environmental temperature or weather effects. The door assembly 170 also may include several gasket strips 183 which may be disposed along a perimeter of, for example, the inner panel 176, and are disposed between the inner panel 176 and a frame member of the outer housing 101 illustrated in FIG. 10, for example the frame members 152, 154 illustrated in FIG. 10. The gasket strips 183 may include, for example, a rubber material, and may operate to block the ingress of liquids through the door assembly 170 and into the contaminant scrubber. In certain embodiments, the gasket strips 183 may interact with the outer panel 172 in addition to, or alternative to, the inner panel 176.

The door assembly 170 also includes the illustrated handles 168. Each handle 168 may include a fastening rod 177 which extends through corresponding openings 179, 181 in the inner panel and outer panel 172, 176, respectively. In some embodiments, the middle layer 174 of the door assembly 170 is smaller than the inner and outer layers 172, 176. Thus, the fastening rods 177 of the handles 168 may not pierce the intermediate layer 174, and the intermediate layer 174 may be held in place by being sandwiched between the inner and outer layers 172, 176. However, in some embodiments, the middle layer 174 may include openings through which the fastening rods 177 extend.

Figure 12:
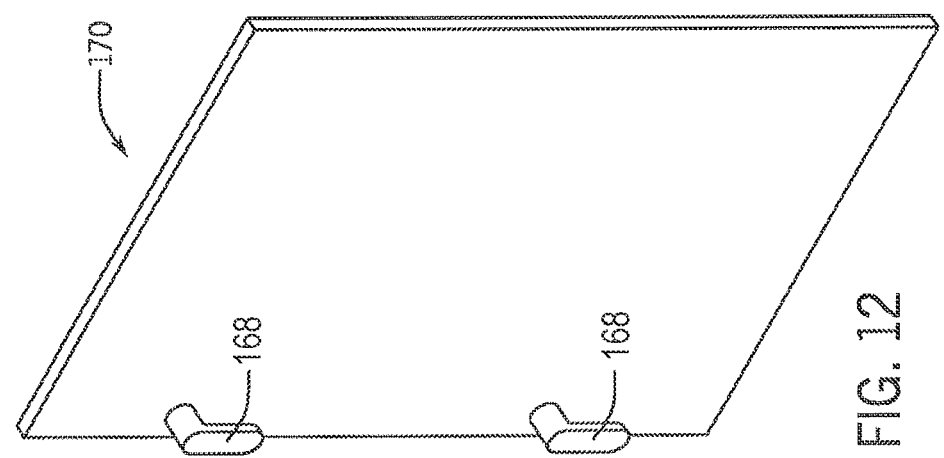
FIG. 12 is a perspective view of the door assembly of FIG. 11, in accordance with embodiments described herein.

The door assembly 170 also includes anchors 180 which receive the fastening rods 177. For example, each anchor 180 may include a nut, or some other threaded device, which receives the corresponding fastening rod 179 of the corresponding handle 172. The anchors 180 may be configured such that, when the handles 172 point in a first direction, such as downwardly as shown, the anchors 180 block opening of the door assembly 170. For example, the anchors 180 may interact with the aforementioned frame members of the outdoor contaminant scrubber to maintain a closed position of the door. When the handles 172 are turned in a second direction, such as a counterclockwise, quarter-turn from the position illustrated in FIG. 11, the anchors 180 may facilitate opening of the door assembly 170. For example, the anchors 180 may release from the frame members of the outdoor contaminant scrubber to facilitate an opening of the door assembly 170. A hinge may be positioned along the door assembly 170, for example along the illustrated edge 182, to facilitate opening and closing of the door assembly 170 about the hinge. In other embodiments, the door assembly 170 may be removed entirely after turning the handles 172 as described above. Additional illustrations of portions of the door assembly 170 are shown in FIG. 12, which is an assembled perspective view of the door assembly 170, FIG. 13, which is a side view of the door assembly 170, and FIG. 14, which is a perspective view of a backside of the door assembly 170.

Figure 15:
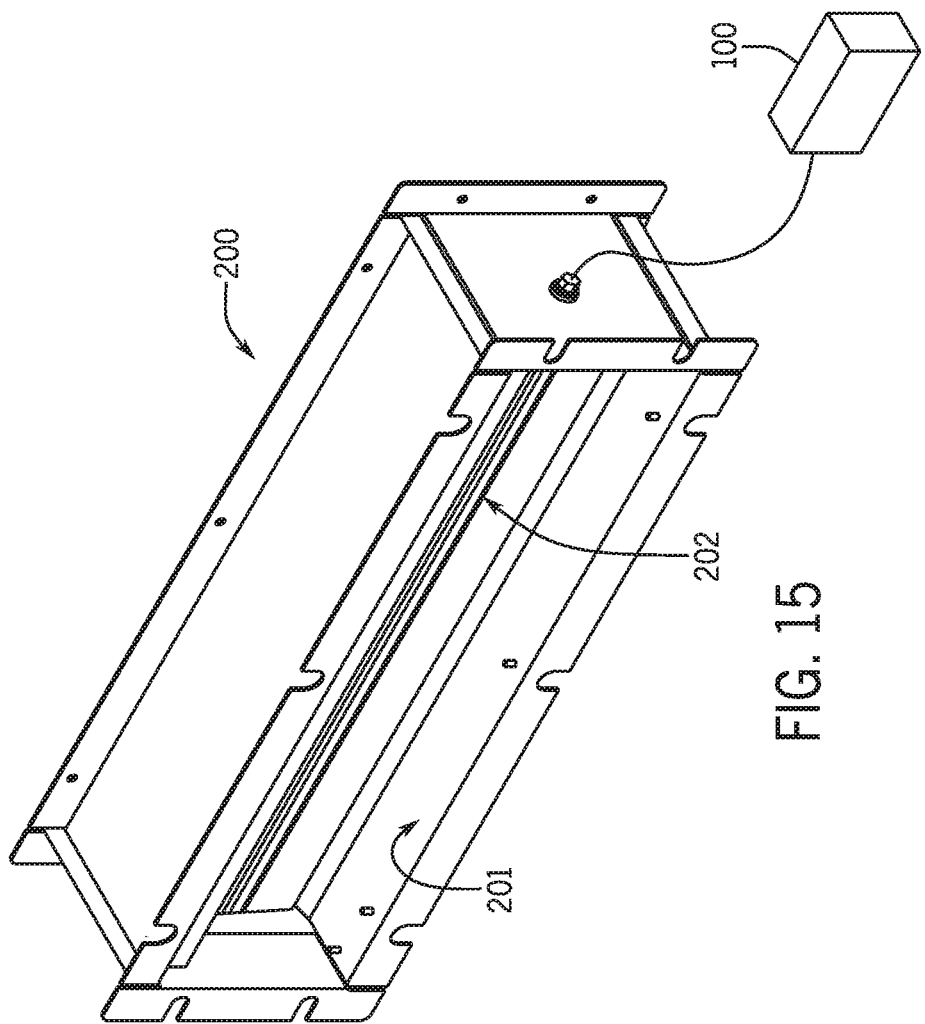
FIG. 15 is a perspective view of a damper for use in the outdoor contaminant scrubber of FIG. 5, in accordance with embodiments described herein.
Figure 14:
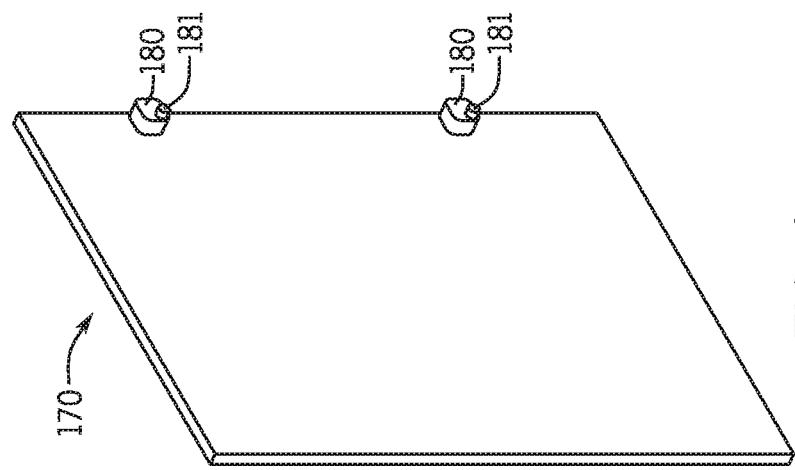
FIG. 14 is a perspective view of a backside of the door assembly of FIG. 11, in accordance with embodiments described herein.

FIG. 15 is a perspective view of an embodiment of a damper 200 for use in the outdoor contaminant scrubber 100. The outdoor contaminant scrubber 100 is illustrated schematically in FIG. 15, to demonstrate the relationship between the damper 200 and the outdoor contaminant scrubber 100.

The illustrated damper 200 may be used, for example, as the sorption inlet damper, the sorption outlet damper, the purge/regeneration inlet damper, the purge/regeneration outlet damper, and/or the closed loop damper. The outdoor contaminant scrubber, unlike certain indoor contaminant scrubbers, may include dampers which do not couple to flex ducting, such as circular flex ducting, and dampers which do not couple to any ducting. Thus, circular dampers are not required for use in the outdoor contaminant scrubber. Further, the illustrated rectangular dampers may include a rectangular flow path perimeter 201, which refers to the inner surface of the damper 200 defining the flow path, for other reasons. For example, an Air Movement and Control Association (AMCA) 511 certified low leak economizer blade 202 suitable for the rectangular damper 200 may be employed. The AMCA 511 certified economizer blades 202 may improve air movement and may insulate the unit for improved temperature consistency.

One or more of the disclosed embodiments, alone or in combination, may provide one or more technical effects useful in installing and/or operating an outdoor contaminant scrubber of an HVAC system. Disclosed embodiments of the outdoor contaminant scrubber improve ease, time, and cost of installation and maintenance. Further, disclosed embodiments of the outdoor contaminant scrubber improve operation and durability of the outdoor contaminant scrubber via the disclosed arrangement of the dampers and weatherization of the unit.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A contaminant scrubber of a heating, ventilation, and air conditioning (HVAC) system, the contaminant scrubber comprising:
    a sorption cavity;
    a sorption inlet damper configured to receive return air from a conditioned space and into the sorption cavity;
    a sorption outlet damper configured to output the return air from the sorption cavity and toward the conditioned space;
    an outer housing about the sorption cavity, the outer housing including a mount-facing side wall along which the sorption inlet damper and the sorption outlet damper are disposed;
    inner cabinetry disposed within the outer housing;
    a first inner space of the sorption cavity; and
    a second inner space of the sorption cavity separated from the first inner space by the inner cabinetry, wherein the sorption inlet damper extends into the first inner space, and wherein the sorption outlet damper extends into the second inner space.

2. The contaminant scrubber of claim 1, comprising:
    an additional side wall of the outer housing that is adjacent and coupled to the mount-facing side wall; and
    a purge and regeneration inlet damper disposed along the additional side wall and configured to direct outdoor airflow into the sorption cavity.

3. The contaminant scrubber of claim 2, comprising a door assembly forming a portion of the outer housing, disposed along the additional side wall, and configured to provide access to the sorption cavity.

4. The contaminant scrubber of claim 2, comprising:
    a second additional side wall of the outer housing that opposes the additional side wall and is adjacent and coupled to the mount-facing side wall; and
    a purge and regeneration outlet damper disposed along the second additional side wall.

5. The contaminant scrubber of claim 2, comprising a rain hood disposed on an outer surface of the additional side wall and over the purge and regeneration inlet damper, wherein the rain hood is configured to block ingress of liquid through the purge and regeneration inlet damper.

6. The contaminant scrubber of claim 1, comprising a purge and regeneration inlet damper having a rectangular flow path perimeter.

7. The contaminant scrubber of claim 1, comprising a door assembly configured to provide access to the sorption cavity and having a door panel, an insulating layer, and an additional door panel, wherein the insulating layer is positioned between the door panel and the additional door panel.

8. The contaminant scrubber of claim 1, comprising:
    a door assembly at least partially defining the outer housing, configured to provide access to the sorption cavity, and having a door panel; and
    a gasket strip disposed between the door panel and a frame member of a frame of the outer housing.

9. The contaminant scrubber of claim 1, comprising a contaminant cartridge set disposed within the sorption cavity and configured to decontaminate the return air received by the sorption inlet damper.

10. The contaminant scrubber of claim 1, wherein the contaminant scrubber is configured to be disposed in an outdoor environment.

11. The contaminant scrubber of claim 1, wherein the mount-facing side wall comprises:
a mounting box; and
a frame member disposed between the mounting box and the sorption cavity.

12. The contaminant scrubber of claim 1, wherein the mount-facing side wall comprises a frame member and a mounting box such that the mount-facing side wall is configured to support a weight of the contaminant scrubber.

13. A contaminant scrubber of a heating, ventilation, and air conditioning (HVAC) system, the contaminant scrubber comprising:
a sorption cavity;
a sorption inlet damper configured to receive return air from a conditioned space and into the sorption cavity;
a sorption outlet damper configured to output the return air from the sorption cavity and toward the conditioned space; and
an outer housing about the sorption cavity, the outer housing including a mount-facing side wall along which the sorption inlet damper and the sorption outlet damper are disposed, wherein the mount-facing side wall comprises a mounting box having the sorption inlet damper and the sorption outlet damper extending therethrough.

14. A contaminant scrubber of a heating, ventilation, and air conditioning (HVAC) system, the contaminant scrubber comprising:
a sorption cavity;
a sorption inlet damper configured to receive return air from a conditioned space and into the sorption cavity;
a sorption outlet damper configured to output the return air from the sorption cavity and toward the conditioned space;
an outer housing about the sorption cavity, the outer housing including a mount-facing side wall along which the sorption inlet damper and the sorption outlet damper are disposed; and
a purge and regeneration inlet damper; and
a low leak economizer blade disposed in the purge and regeneration inlet damper.

15. The contaminant scrubber of claim 14, wherein the purge and regeneration inlet damper comprises a rectangular cross-section.

* * * * *